United States Patent
Yamaguchi (12)

(10) Patent No.: US 6,980,342 B1
(45) Date of Patent: Dec. 27, 2005

(54) OPTICAL BEAM SCANNING DEVICE

(75) Inventor: Masao Yamaguchi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/959,075

(22) Filed: Oct. 7, 2004

(51) Int. Cl.[7] .............................................. G02B 26/08
(52) U.S. Cl. ...................... 359/205; 359/206
(58) Field of Search ........................ 359/205, 216–218, 359/206

(56) References Cited

U.S. PATENT DOCUMENTS

| 6,667,757 B2 | 12/2003 | Yamaguchi et al. |
| 2004/0190099 A1 | 9/2004 | Yamaguchi |

FOREIGN PATENT DOCUMENTS

| JP | 2002-328323 A | 11/2002 |

OTHER PUBLICATIONS

U.S. Appl. No. 10/424,834, filed Apr. 29, 2003, Yamaguchi.
U.S. Appl. No. 10/879,999, filed Jun. 30, 2004, Yamaguchi.

*Primary Examiner*—Euncha P. Cherry
(74) *Attorney, Agent, or Firm*—Foley & Lardner LLP

(57) ABSTRACT

An optical beam scanning device 21 includes a pre-deflection optical system 40 for adjusting a laser beam L emitted from a semiconductor laser element 41 so as to be focused as a line image longitudinally extending in a direction corresponding to a main scanning direction, a polygon mirror 50 for scanning a photosensitive drum 23 with the laser beam L, and an imaging optical system 60 for focusing the laser beam L scanned by the polygon mirror 50 on the photosensitive drum 23. The imaging optical system 60 includes one or a plurality of lenses, and is formed so as to satisfy Lc/Le≧2.2, where a light passage distance through the inside of the lens when scanning the center of an image region is denoted as Lc and a light passage distance through the inside of the lens when scanning the end of the image region is denoted as Le. The imaging optical system 60 may include a plastic lens composed of one lens or a plastic lens along with a glass lens.

16 Claims, 9 Drawing Sheets

FIG.6

| Lc/Le | 1.0 | 2.2 | 2.8 |
|---|---|---|---|
| DEFLECTION IN LIGHT AMOUNT (%) | 14.0 | 9.8 | 8.4 |
| IMAGE EVALUATION (SUBJECTIVE EVALUATION OF DENSITY UNEVENNESS) | × | ○ | ○ |

FIG. 7
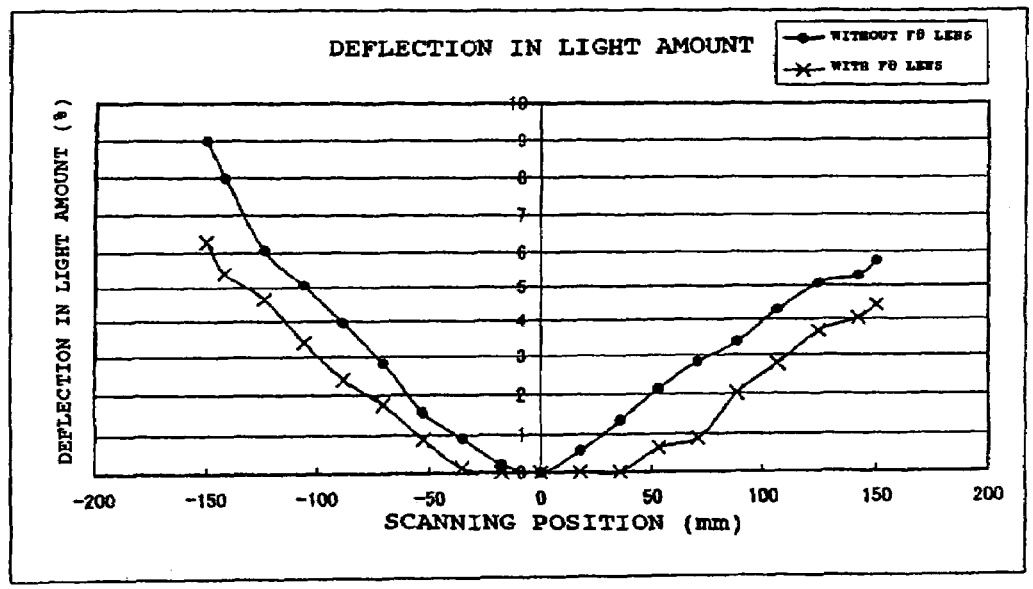
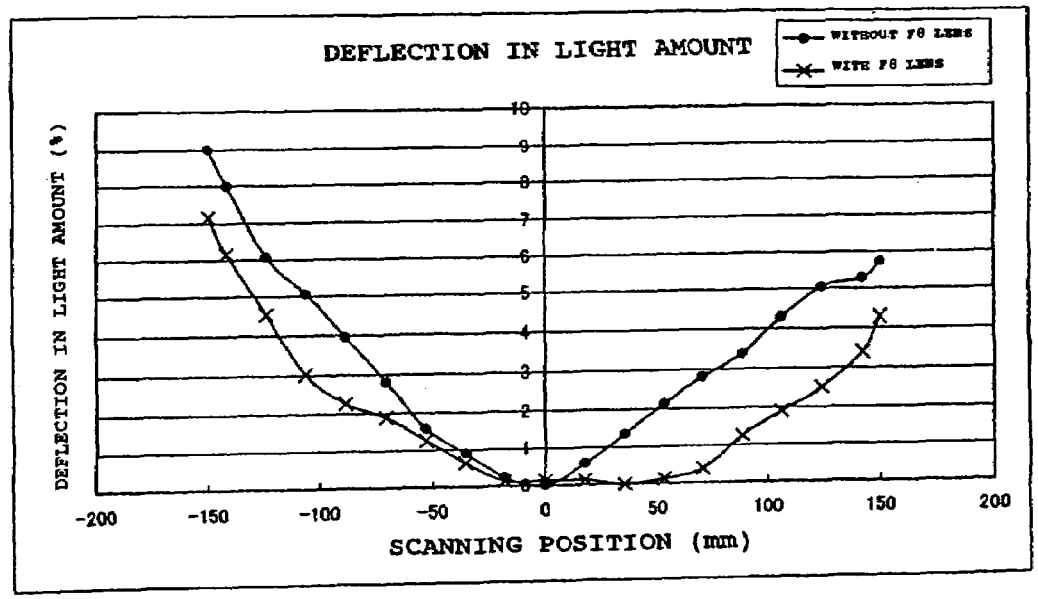
FIG. 8

INCIDENCE PLANE

| CUY | CYZ | AY | AZ |
|---|---|---|---|
| -5.672E-03 | -4.660E-03 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.000E+00 | 2.787E-03 | 1.980E-03 | 1.335E-07 | 1.044E-07 | -2.786E-11 | -7.059E-12 | 3.692E-15 | 1.841E-16 | -6.741E-20 | -1.779E-20 |
| 1 | 4.553E-03 | 1.328E-06 | -2.476E-06 | 5.778E-10 | 9.129E-11 | -1.236E-14 | -7.811E-15 | -2.800E-18 | 3.600E-19 | 6.332E-22 | 8.659E-24 |
| 2 | 5.619E-06 | -7.489E-09 | -8.817E-10 | 1.685E-12 | -6.660E-14 | -5.188E-16 | 9.075E-18 | 1.148E-19 | 5.498E-21 | -5.670E-24 | -3.951E-25 |

OUTGOING PLANE

| CUY | CYZ | AY | AZ |
|---|---|---|---|
| 5.092E-03 | 1.651E-02 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.000E+00 | -1.071E-03 | -8.388E-04 | 1.647E-07 | 5.067E-08 | -2.561E-11 | -4.086E-12 | 1.397E-15 | 1.539E-16 | 1.951E-19 | -4.158E-20 |
| 1 | 3.809E-03 | 9.143E-07 | -3.924E-07 | 5.036E-10 | 4.401E-11 | -2.248E-14 | -5.812E-16 | 4.130E-18 | -1.228E-19 | 2.809E-22 | 9.314E-24 |
| 2 | 2.945E-06 | -4.016E-09 | -1.720E-10 | 2.644E-13 | -3.675E-14 | -4.145E-17 | -1.222E-17 | 1.238E-20 | 3.609E-21 | 1.408E-24 | 7.214E-26 |

FIG. 10

OPTICAL BEAM SCANNING DEVICE

BACKGROUND OF THE INVENTION

1. Field of the Invention

The present invention relates to optical beam scanning devices for use in a laser beam printer, a digital copying machine, etc., and in particular relates to an optical beam scanning device suitable for use in an over illumination scanning optical system in that the width of a beam in a main scanning direction incident on a polygon mirror is larger than a reflection surface of the polygon mirror in the main scanning direction.

2. Description of the Related Art

The optical beam scanning device is a generally known technique. In addition, a rotational axial direction of a deflector is referred to as a subscanning direction and a direction perpendicular to an optical axis of an optical system and the rotational axial direction of the deflector is referred to a main scanning direction below.

The subscanning direction in an optical system corresponds to a conveying direction of a transfer member in an image-forming apparatus while the main scanning direction corresponds to a direction perpendicular to the conveying direction in the plane of the transfer member. An image surface denotes a photosensitive drum surface, and an image plane represents a surface on which a beam is focused in practice.

In general, between an image processing speed (a paper conveying speed), an image resolution, a motor rotational speed, and the number of surfaces of a polygon mirror, the following relationship is found:

$$P*R = \frac{25.4*Vr*N}{60} \quad (1)$$

where,

P(mn/s): image processing speed (paper conveying speed)
R(dpi): image resolution (the number of dots per inch)
Vr(rpm): rotational speed of polygon motor
N: the number of surfaces of polygon mirror.

From the equation (1), the printing speed and the resolution are proportional to the number of surfaces of the polygon mirror and the rotational speed of polygon mirror. Hence, in order to achieve the speeding up and the resolution increasing, it is necessary to increase the number of surfaces of the polygon mirror or the rotational speed of polygon mirror.

However, in a conventional general under illumination scanning optical system, the width of a beam in the main scanning direction incident on the polygon mirror is smaller than that of the reflection surface of one mirror surface of the polygon mirror in the main scanning direction, so that the entire incident beam is reflected. The beam diameter on the image surface is proportional to an F number. An F number Fn is expressed by Fn=f/D, where a focal distance of an imaging optical system is f and the main scanning beam diameter on the polygon mirror surface is D. Accordingly, for increasing image quality, when the beam diameter on the image surface is to be reduced smaller, the main scanning beam diameter on the polygon mirror surface must be increased. Hence, when the number of surfaces of the polygon mirror is increased for achieving the speeding up and the resolution increasing, the polygon mirror must be increased in size. Then, when this is rotated at a high speed, the load to the motor increases. Hence, as electric power consumption of the motor increases or a large sized motor is used for corresponding to the load, cost is increased. Also, noise, vibration, and heat are largely produced, so that measures are required for them.

Then, as the measures therefor, an over illumination scanning optical system is effective. In the over illumination scanning optical system, the width of a beam in the main scanning direction incident on the polygon mirror is larger than that of one polygon mirror surface in the main scanning direction. Therefore, because the beam is reflected on the entire reflection surface, even when the number of reflection surfaces is increased as well as the beam diameter is secured on the polygon mirror for speeding up and increasing the resolution, the diameter of the polygon mirror can be reduced smaller.

Since the load to the polygon motor can be thereby reduced, the reduction in cost is possible. Also, because the polygon mirror is small in diameter and the number of surfaces is large, the shape of the polygon mirror approaches a circle, so that an air resistance is reduced, and the generation of noise, vibration, and heat can be reduced even when the polygon mirror is rotated at a high speed.

Due to the reduction in noise and vibration, a component such as glass may be eliminated or reduced, thereby also reducing the cost. A high duty cycle is also possible. With respect to this over illumination scanning optical system, there is a description in "Laser Scanning Notebook" (by Leo Beiser, SPIE OPTICAL ENGINEERING PRESS), for example.

However, by the above-mentioned conventional scanning optical system, unevenness in image density cannot be dissolved.

The transmission factor of a lens is maximal when a beam is perpendicularly incident on the lens, and is reduced with increasing angle to the normal of an incident surface (an incident angle). Hence, in the case of an fθ lens, the incident angle to the lens is increased at a scanning end, so that the transmission factor is smaller than that in the central scanning range, reducing the amount of light. Accordingly, the difference in amount of light between the central scanning range and the scanning end is large, and the image density difference is also increased.

On the countermeasure, therefore, the transfer factor is generally improved by the evaporation on the lens surface; however, when the fθ lens is made of plastics, if this lens surface is evaporated, the following problems arise.

When a plastic lens is used for the fθ lens, since it is exposed to elevated temperatures during the evaporation on the surface, the lens is deflected, deteriorating optical characteristics. In order to dissolve this problem, it is required to form the lens in view of the deflection. That is, it is necessary that the lens before the evaporation must be shaped to adjust it to the desired final shape after the deflection due to the evaporation. However, it is not easy to precisely analyze the deflection amount so that the manufacturing becomes very difficult. Furthermore, the evaporation increases the cost.

Moreover, in the case of the over illumination type, since the width of a beam varies with a scanning angle, unevenness in the amount of light on the image surface increases.

FIG. 1 shows widths of a beam reflected by the polygon mirror when the axis of the beam incident to the polygon mirror and an optical axis of an optical system after deflection are made to form an angle (in a case of not 0°).

If the reflection widths herein of the incident side to the polygon mirror (a), the central position of the scanning region (b), and the opposite side to the incidence (c) are D1, D2, and D3, respectively, the relationship is D1>D2>D3, so that dispersion is produced in the amount of light on the image surface.

FIG. 1 also shows intensity distributions of the beam before incidence to the polygon mirror. If the cross-sectional areas of the intensity distributions at positions (a), (b), and (c) are Sa, Sb, and Sc, respectively, the relationship is Sa>Sc and Sb>Sc because the beam width at each of the positions (a), (b), and (c) is different, and the used beam is a laser beam exhibiting the intensity distribution of Gaussian distribution. Since the amount of light is a volume of a used portion in the beam intensity distribution, if the amounts of light on image surfaces are Pa, Pb, and Pc, respectively, the relationship is Pa>Pc,>Pb>Pc. Hence, there is a problem that unevenness in the amount of light of the over illumination optical system is larger than that of the under illumination optical system, which is a conventional optical system.

SUMMARY OF THE INVENTION

In general, when a beam passes through the inside of a lens, the absorption of light is generated. The amount of light absorption is related to the distance of the inside of lens where the beam passes through. Then, the distance of the lens inside where the beam passes through is larger at the central position of the scanning region while is smaller at the scanning end, so that the amount of light absorption when the beam passes through the lens inside can be larger at the central position of the scanning region while can be smaller at the scanning end. The dispersion of the amount of light after passing through the lens is thereby reduced over the entire scanning region, enabling the image quality to be improved.

The present invention has been made in recognizing this point. Specifically, when a light passage distance through the inside of the lens when the light beam scans the center of an image region is denoted as Lc and a light passage distance through the inside of the lens when the light beam scans the end of the image region is denoted as Le, an imaging optical system is formed to satisfy Lc/Le≧2.2.

BRIEF DESCRIPTION OF THE DRAWINGS

FIG. 6 is a table showing comparison of light amount on an imaging surface and evaluation results when unevenness is generated in each light amount, when Lc/Le of the fθ lens according to the embodiment is 1, 2.2, and 2.8.

FIG. 7 is a graph comparing the difference of the unevenness in light amount before and after light passes through the fθ lens with 2.8 Lc/Le.

FIG. 8 is a graph comparing the difference of the unevenness in light amount before and after light passes through the fθ lens with 2.2 Lc/Le.

FIG. 10 includes tables showing conditions defining shapes of lens surfaces of an imaging lens.

BEST MODE FOR CARRYING OUT THE INVENTION

Figure 1:
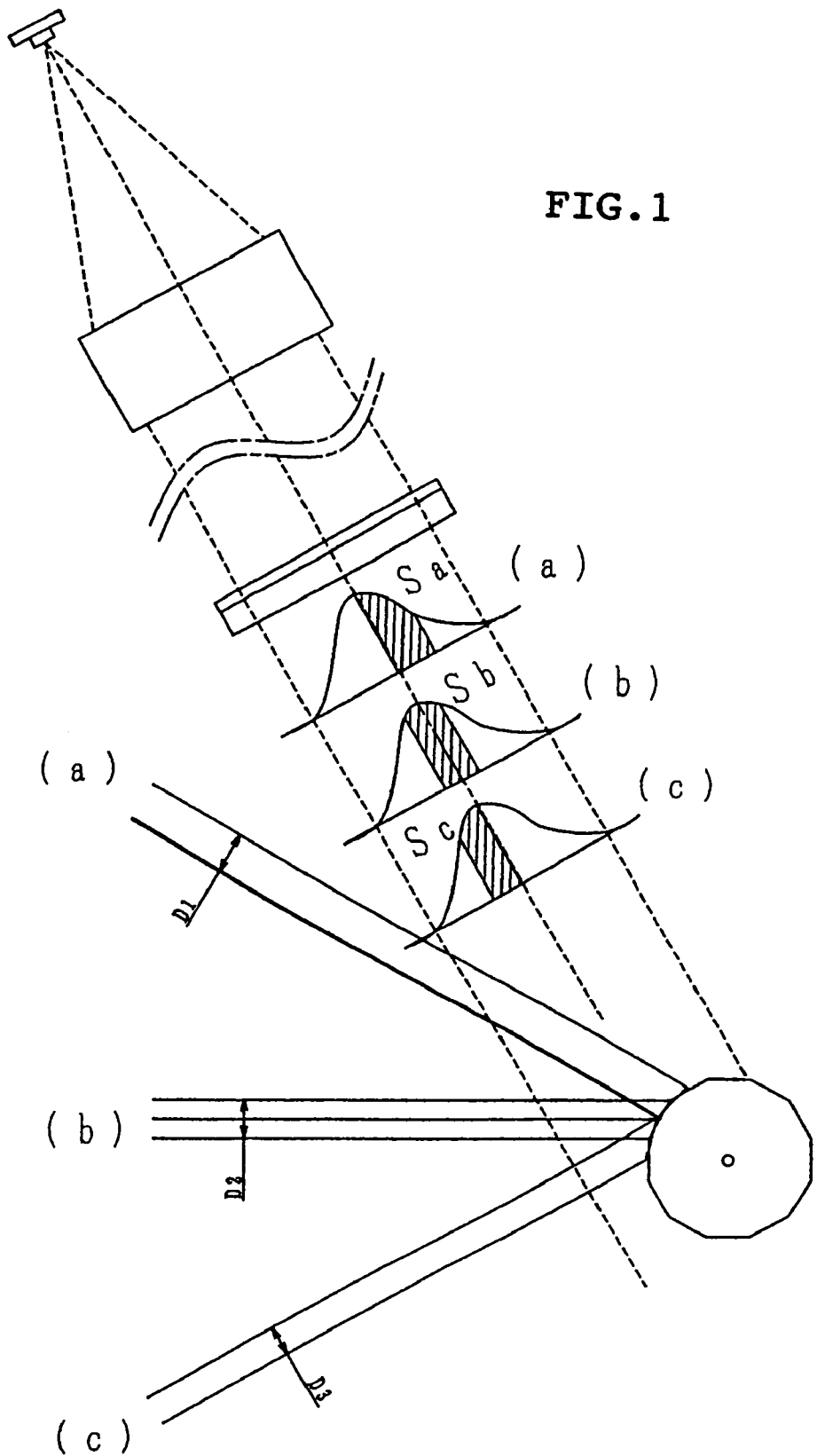
FIG. 1 is a schematic view showing intensity distribution of a beam before incident to a polygon mirror and the width of the beam reflected by the polygon mirror.
Figure 2:
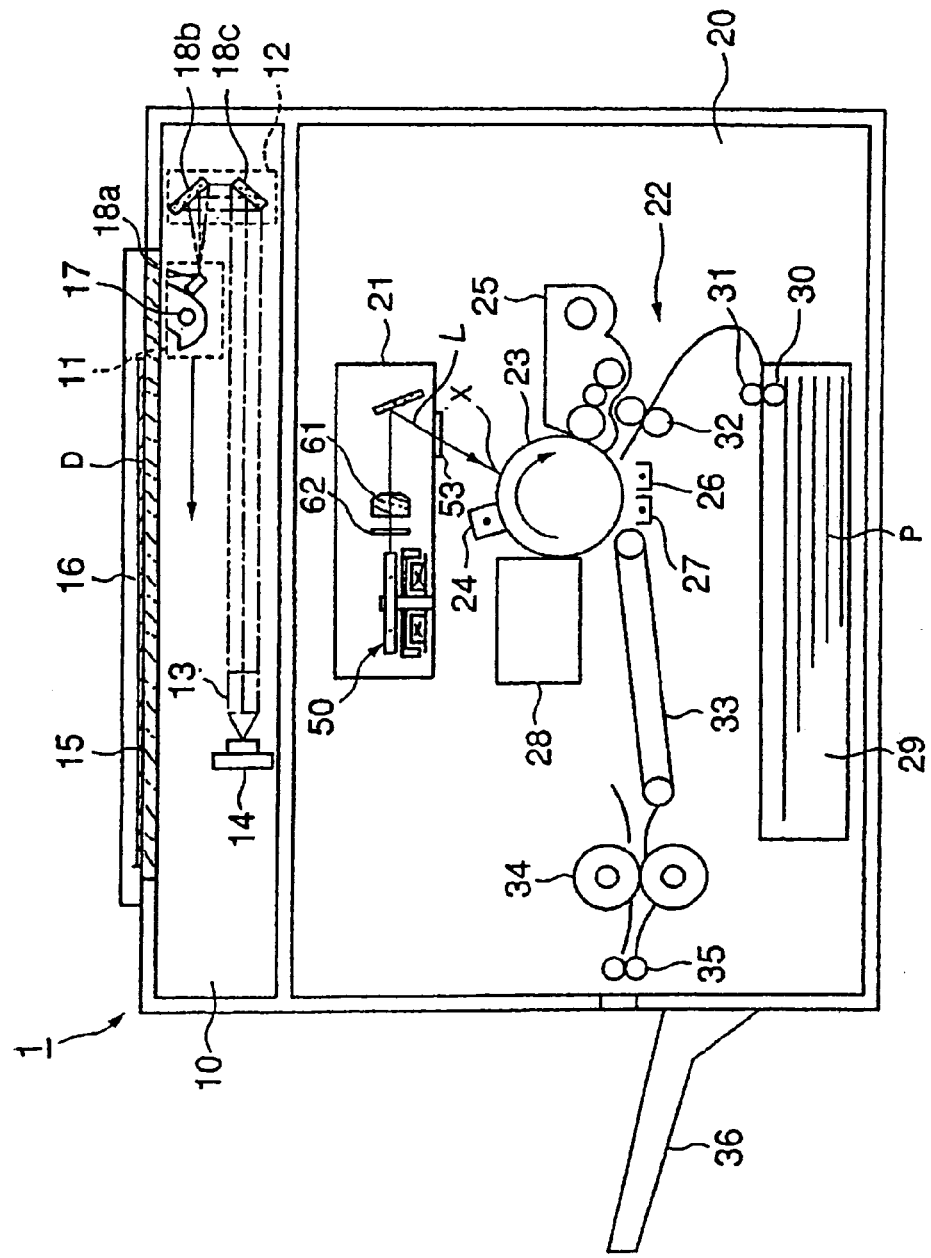
FIG. 2 is a schematic side sectional view showing an example of an image-forming apparatus having an optical beam scanning device according to an embodiment of the present invention.

An embodiment according to the present invention will be described in detail below with reference to the drawings. FIG. 2 is a schematic structural drawing of a digital copying machine as an image-forming apparatus having an optical beam scanning device according to the embodiment of the present invention.

As shown in FIG. 2, a digital copying machine 1 is composed of a scanner unit 10 as image reading means and a printer section 20 as image-forming means, for example.

The scanner unit 10 is composed of a first carriage 11 movably constructed in arrow direction in the drawing, a second carriage 12 being movable in accordance with the first carriage 11, an optical lens 13 applying predetermined focusing characteristics to light from the second carriage 12, a photoelectric transducer 14 for photoelectrically converting the light having the predetermined focusing characteristics applied by the optical lens 13 so as to output an electric signal, a document table 15 for holding a document D, and a document restraining cover 16 for urging the document D on the document table 15.

The first carriage 11 is provided with a light source 17 for illuminating the document D and a mirror 18a for reflecting light reflected from the document D toward the second carriage 12 by being illuminated by light irradiated from the light source 17.

The second carriage 12 includes a mirror 18b for bending the light transmitted from the mirror 18a of the first carriage 11 through 90° and a mirror 18c for further bending the light bent by the mirror 18b through 90°.

Thereby, the document D placed on the document table 15 is illuminated by the light source 17 so as to reflect reflection light distributing shades of light corresponding to the presence of an image. The reflection light of the document D is incident on the optical lens 13 via the mirrors 18a, 18b, and 18c as image formation of the document D. The reflection light guided by the optical lens 13 from the document D is condensed by the optical lens 13 on a light-receiving surface of the photoelectric transducer (CCD sensor) 14.

Upon input a command to initiate image forming produced from an operation panel (not shown) or an external device, the first carriage 11 and the second carriage 12 are once moved by driving of a motor for driving a carriage (not shown) to a home position defined to have a predetermined positional relationship to the document table 15. Thereafter, by being moved along the document table 15 at a predetermined speed, the image information of the document D, i.e. the image light reflected from the document D, is cut out in units of a predetermined width in the longitudinal direction of the mirror 18a, i.e., in the main scanning direction, so as to reflect toward the mirror 18b, while is sequentially taken out in units of the width cut out by the mirror 18a in a direction perpendicular to the longitudinal direction of the mirror 18a, i.e., in the subscanning direction, so that the entire image information of the document D is guided to the photoelectric transducer 14. In addition, an electric signal produced from the photoelectric transducer 14 is an analogue signal, and is converted into a digital signal by an A/D converter (not shown) and temporarily stored in an image memory (not shown) as an image signal.

In the way described above, the image information of the document D placed on the document table 15 is converted in an image processor (not shown) into a signal showing shades of an image, such as an 8-bit digital image signal, by the photoelectric transducer 14 in every line arranged along a first direction, which is the longitudinal direction of the mirror 18a.

The printer section 20 includes an optical beam scanning device 21 as an exposure device, which will be described in a subsequent stage, and an electrophotographic image-forming unit 22 being able to form images on a recording paper P, which is a medium to be formed images thereon.

The image-forming unit 22 includes a drum-shaped photosensitive member (referred to as a photosensitive drum below) 23 rotated by a main motor 23A (see FIG. 3) so that the peripheral surface moves at a predetermined speed for forming an electrostatic latent image corresponding to image data, i.e. an image of the document D, by exposure to a laser beam L from the optical beam scanning device 21; a charging device 24 for applying a surface voltage with predetermined polarity on the surface of the photosensitive drum 23; a developer unit 25 for developing the electrostatic latent image formed by the optical beam scanning device on the photosensitive drum 23 by selectively supplying toner as a visualization member; a transfer device 26 for transferring the toner image formed on the external surface of the photosensitive drum 23 by the developer unit 25 onto the recording paper P by applying a predetermined electric field; a separation device 27 for separating the recording paper P having the toner image transferred by the transfer device 26 and toner between the recording paper P and the photosensitive drum 23 (from the photosensitive drum 23) by releasing them from electrostatic attraction to the photosensitive drum 23; and a cleaning device 28 for returning the potential distribution of the photosensitive drum 23 to the state of the surface potential before being supplied by the charging device 24 by removing transfer-residual toner remained on the external surface of the photosensitive drum 23. In addition, the charging device 24, the developer unit 25, the transfer device 26, the separation device 27, and the cleaning device 28 are arranged along arrow direction, along which the photosensitive drum 23 is rotated, in that order. A predetermined position X on the photosensitive drum 23 between the charging device 24 and the developer unit 25 is irradiated with a laser beam L from the optical beam scanning device 21.

The image signal read from the document D in the scanner unit 10 is converted into a print signal with processing, such as gradation processing for contour correction or for halftone displaying in the image processor. The image signal is further converted into a laser modulation signal for changing the light intensity of a laser bean irradiated from a semiconductor laser element, which will be described later, of the optical beam scanning device 21 into any one of an intensity being able to record the electrostatic latent image on the external surface of the photosensitive drum 23 having a predetermined surface potential applied by the charging device 24 and an intensity that does not record the latent image.

Each semiconductor laser element, which will be described later, of the optical beam scanning device 21 is modulated in intensity in accordance with the laser modulation signal mentioned above so as to emit light for recording the electrostatic latent image at a predetermined position of the photosensitive drum 23 corresponding to predetermined image data. The light from the semiconductor laser element is deflected in a first direction, which is identical to a reading line of the scanner unit 10, by a deflection device, which will be described later, in the optical beam scanning device 21 so that a predetermined position X of the external periphery of the photosensitive drum 23 is irradiated therewith.

Subsequently, by driving of the photosensitive drum 23 in arrow direction at a predetermined speed, the first carriage 11 and the second carriage 12 of the scanner unit 10 are moved along the document table 15 so as to read the information of the document D. Simultaneously, the external periphery is exposed in accordance with the above-mentioned information at predetermined intervals in every line with a laser beam from the semiconductor laser element sequentially deflected by the deflection device.

In such a manner, on the external periphery of the photosensitive drum 23, an electrostatic latent image is formed in accordance with an image signal.

The electrostatic latent image formed on the external periphery of the photosensitive drum 23 is developed with toner from the developer unit 25, and is conveyed to a position opposing the transfer device 26 by the rotation of the photosensitive drum 23 and transferred by an electric field from the transfer device 26 on the recording paper P, one of which is taken out of a paper cassette 29 by a feed roller 30 and a separation roller 31 and matched in timing by aligning rollers 32 for supply.

The recording paper P having a toner image transferred thereon is separated together with toner by the separation device 27, and is guided to a fuser 34 by a conveying device 33.

The recording paper P guided to the fuser 34 is discharged onto a tray 36 by discharge rollers 35 after toner (toner image) is fixed by heat and pressure from the fuser 34.

On the other hand, after toner (toner image) is transferred on the recording paper P by the transfer device 26, the photosensitive drum 23 is opposed to the cleaning device 28 as a result of consequent rotation, so that transfer residual toner remaining on the external periphery (residual toner) is removed and returned to an original state, which is a previous state before the surface potential is supplied by the charging device 24, enabling the following image formation.

By the repetition of the process described above, continuous image-forming operation is enabled.

In such a manner, in the document D set on the document table 15, image information is read in the scanner unit 10 so that the read image information is converted into a toner image in the printer section 20 for being copied by producing it to the recording paper P.

In addition, in the image-forming apparatus described above, the digital copying machine is exemplified; however, a printer having no reading unit may also be obviously applied.

Figure 3A:
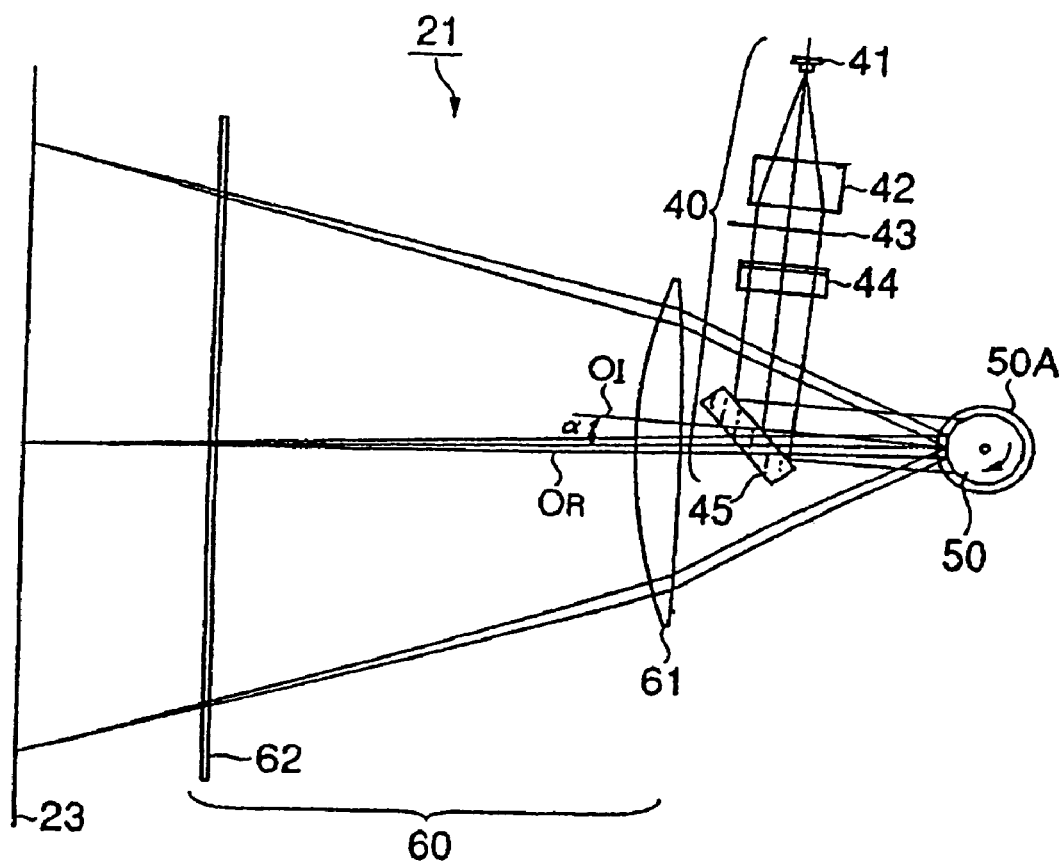
FIG. 3 includes a schematic plan view and a schematic side view showing the optical beam scanning device according to the embodiment.
Figure 3B:
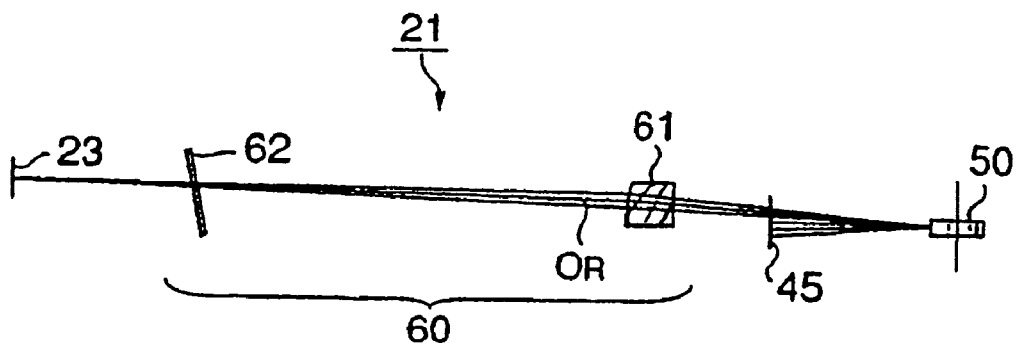

FIG. 3A and FIG. 3B are schematic structural drawings for illustrating the structure of the optical beam scanning device 21 shown in FIG. 2. In addition, FIG. 3A is a schematic plan view for illustrating optical components arranged between the light source (the semiconductor laser elements) included in the optical beam scanning device and the photosensitive drum (an object to be scanned) by viewing them in a direction perpendicular to the main scanning direction (first direction), which is parallel to the direction scanned by the light deflection device of an optical beam emitted from the light deflection device (polygon mirror)

toward the photosensitive drum, and also by developing folding by the mirrors. FIG. 3B is a schematic sectional view showing the direction shown in FIG. 3A, i.e. subscanning direction (second direction), to be a plane.

As shown in FIG. 3A and FIG. 3B, the optical beam scanning device 21 includes a pre-deflection optical system 40 including a semiconductor laser element (light source) 41 emitting a 780 nm laser beam (optical beam) L; a lens 42 for converting the sectional beam shape of the laser beam L emitted from the semiconductor laser element 41 into converging light, parallel light, or divergent light; an aperture 43 for restricting the amount of light (beam width) of the laser beam L passed through the lens 42 to a predetermined size; a cylindrical lens 44 having positive power applied only in the subscanning direction for adjusting the sectional shape of the laser beam L having the amount of light restricted by the aperture-43 to be a predetermined sectional beam shape; and a mirror 45 for bending the laser beam L in a predetermined direction emitted from the semiconductor laser element 41 having a sectional shape adjusted in a predetermined sectional beam shape by a finite focal point lens, or the collimate lens 42, the aperture 43, and the cylindrical lens 44.

In a direction that the laser beam L having a predetermined sectional beam shape applied by the pre-deflection optical system 40 proceeds, there is provided a polygon mirror (light deflection device) 50. The polygon mirror 50 integrally formed with a polygon mirror motor 50A rotating at a predetermined speed scans the laser beam L having a predetermined sectional beam shape adjusted by the cylindrical lens 44 toward the photosensitive drum (a surface to be scanned) 23 arranged in a subsequent stage.

Between the polygon mirror 50 and the photosensitive drum 23, there is provided a focusing optical system 60 substantially linearly focusing the laser beam L continuously reflected by each reflection surface of the polygon mirror 50 along an axial direction of the photosensitive drum 23.

The focusing optical system 60 is composed of an imaging lens having convergence (generally referred to as an fθ lens) 61, toner floating within the image-forming unit 22, and a dust-proof glass 62 for preventing dust or paper dust from coming around into a housing (not shown).

The imaging lens 61 has a predetermined relationship applied based on the rotated angle of the polygon mirror 50 so as to have a predetermined sectional beam diameter even at any position on the photosensitive drum 23 in a longitudinal direction by irradiating the exposure position X (see FIG. 2) from one end to the other end of the photosensitive drum 23 in a longitudinal (axial) direction while proportionating the rotational angle of each reflection surface of the polygon mirror 50 to a position on the photosensitive drum 23 when the photosensitive drum 23 is irradiated with the laser beam L continuously reflected by individual reflection surfaces of the polygon mirror 50. The specific relationship will be described later.

In addition, an optical path of the laser beam L from the semiconductor laser element 41 in the optical beam scanning device 21 to the photosensitive drum 23 is bent with a plurality of mirrors (not shown) within a housing (not shown) of the optical beam scanning device 21. Also, by optimizing curvatures of the imaging lens 61 in the main scanning direction and in the subscanning direction as well as the optical path between the polygon mirror 50 and the photosensitive drum 23, the imaging lens 61 may be integrally formed with at least one of the mirrors (not shown).

Also, in the optical beam scanning device 21 shown in FIG. 3A and FIG. 3B, an angle α defined by an axis 1, along which a main beam of incident laser beam directs each reflection surface of the polygon mirror 50, and an optical axis OR of the focusing optical system 60 when they are projected on a main scanning plane is 50. The scanning angle β is 26°.

In a state of the optical beam scanning device viewed from a subscanning section, an angle defined by the incident laser beam and the optical axis OR is 2°.

Figure 4:
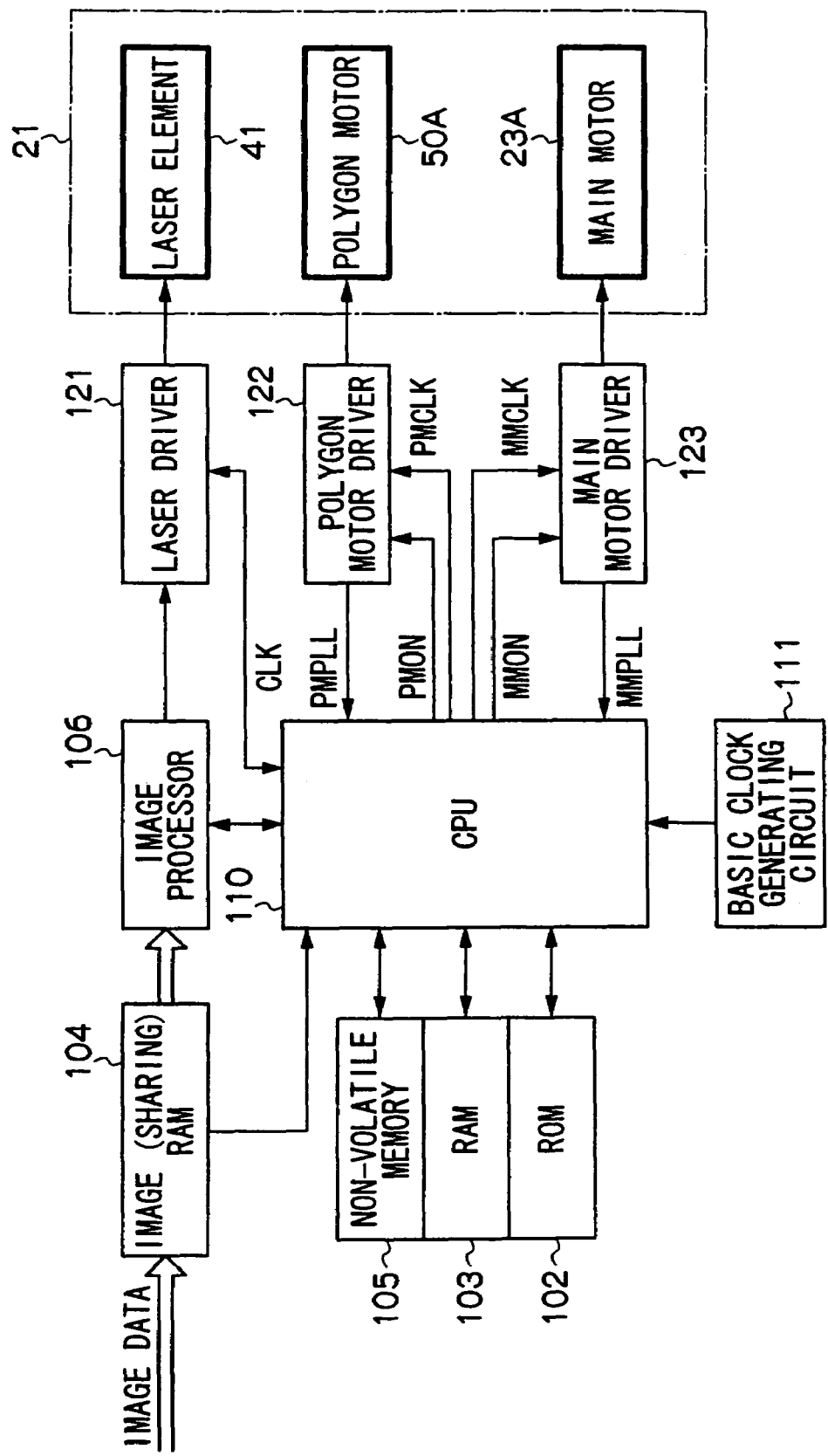
FIG. 4 is a schematic block diagram showing an example of a drive circuit of a digital copying machine according to the embodiment.

FIG. 4 is a schematic block diagram showing an example of a drive circuit of the digital copying machine including the optical beam scanning device shown in FIG. 3A and FIG. 3B.

A CPU 110 as a main control unit is connected to an ROM (read only memory) 102 having predetermined operational regulation and initial data stored therein, an RAM 103 for temporarily storing entered control data, a sharing (image) RAM 104 storing image data from the photoelectric transducer 14 or image data supplied from an external device while producing image data to the following image processing circuit, an NVM (non volatile memory) 105 for storing data stored by that time with battery backup even when electrification to the copying machine 1 is blocked, and an image processor 106 for additionally processing the image data stored in the image RAM 104 so as to be produced in a laser driver, which will be described below.

The CPU 110 is also connected to a laser driver 121 for emitting the semiconductor laser element 41 of the optical beam scanning device 21, a polygon motor driver 122 for driving the polygon motor 50A rotating the polygon mirror 50, and a main motor driver 123 for driving a main motor 23A driving the photosensitive drum 23 and a conveying mechanism for appendant paper (material to be transferred). Therefore, the CPU 110 controls the entire.

In the optical beam scanning device 21 shown in FIG. 3A and FIG. 3B, the sectional beam shape of the emanative laser beam L having the semiconductor laser element 41 emitted thereon is converted by the lens 42 into converging light, parallel light, or divergent light.

To the laser beam L having a converted predetermined sectional beam shape, an optimal beam width and amount of light are established by passing through the aperture 43 as well as predetermined convergence is applied only in the subscanning direction by the cylindrical lens 44. Therefore, the laser beam L becomes linear extending in the main scanning direction on each reflection surface of the polygon mirror 50.

The polygon mirror 50 is a regular dodecahedron, for example, and is formed to have an inscribed circle diameter Dp of 29 mm. The width Wp in the main scanning direction of each reflection surface (12 surfaces) of the polygon mirror 50 is obtained from: when the number of reflection surfaces of the polygon mirror 50 is N, $$Wp = \tan(\pi/N) + Dp.$$

In this example, $$Wp = \tan(\pi/12) \times 29 = 7.77 \text{ mm}.$$

Whereas, the beam width DL in the main scanning direction of the laser beam L to be emitted to each reflection surface of the polygon mirror 50 is generally 32 mm, and is established comparatively wider than the width Wp=7.77 mm of each reflection surface in the main scanning direction of the polygon mirror 50. With increasing beam width in the main scanning direction, dispersion in amount of light on the imaging surface between the scanning end and the scanning center is reduced.

In the laser beam L linearly scanned (deflected) by being continuously reflected when guided to each reflection surface of the rotating polygon mirror 50, the sectional beam diameter has predetermined imaging characteristics applied by the imaging lens 61 of the focusing optical system 60 so as to have uniformity on the photosensitive drum 23 (imaging surface) at least in the main scanning direction, so that the laser beam L is focused on the surface of the photosensitive drum 23 generally linearly. Also, by the imaging lens 61, the rotational angle of each reflection surface of the polygon mirror 50 and the imaging position of the light beam focused on the photosensitive drum 23, i.e. the scanning position, are corrected to have a proportional relationship therebetween.

Hence, the speed of the light beam linearly scanned on the photosensitive drum 23 becomes constant over the entire scanning region due to the imaging lens 61. In addition, the imaging lens 61 is individually non-parallel in the subscanning direction to each reflection surface of the polygon mirror 50. That is, the curvature (curvature in the subscanning direction) is applied capable of correcting the scanning positional displacement in the subscanning direction due to the effect produced by stumbling of each reflection surface. Furthermore, the curvature of field in the subscanning direction is also corrected. In order to correct these optical characteristics, the curvature in the subscanning direction is changed due to the scanning position.

The lens surface shape of the imaging lens 61 is defined, for example, by the table of FIG. 10 and the following equation:

$$X = \frac{CUY*y^2 + CUZ*z^2}{1 + \sqrt{1 - AY*CUY^2*y^2 - AZ*CUZ^2*z^2}} + \sum_{n=0}\sum_{m=0} A_{mn}y^m z^{2n}. \quad (2)$$

By using the imaging lens 61 in such a manner, the rotational angle θ of each reflection surface of the polygon mirror 50 and the position of the laser beam L focused on the photosensitive drum 23 generally have the proportional relationship therebetween, so that the position can be corrected when the laser beam L is focused on the photosensitive drum 23.

The imaging lens 61 can also correct the deflection in inclination between the respective reflection surfaces of the polygon mirror 50 in the subscanning direction, i.e. the positional deflection in the subscanning direction produced by dispersion in amount of stumbling. Specifically, in the laser beam incident surface (side surface of the polygon mirror 50) and the outgoing surface (side surface of the photosensitive drum 23) of the imaging lens 61, by having a generally optically conjugated relationship, even when the inclination defined by an arbitrary reflection surface of the polygon mirror 50 and the rotational axis of the polygon mirror 50 is different (for each reflection surface), the scanning positional deflection in the subscanning direction of the laser beam L guided on the photosensitive drum 23 can be corrected.

In addition, since the sectional beam diameter of the laser beam L depends on the wavelength of the light beam L to be emitted from the semiconductor laser element 41, by reducing the wavelength of the laser beam L to 650 nm, 630 nm, or smaller, the sectional beam diameter of the laser beam L is further reduced smaller.

A folding mirror after deflection is constructed of a plane. That is, the surface tilting correction is performed only by the fθ lens.

The surface shape of the fθ lens has an axis of rotational symmetry to a main scan axis, and it may be a toric lens, for example, in which the curvature in the subscanning direction is different depending on the scanning position. In such a way, the refracting power in the subscanning direction is different depending on the scanning position, so that the curvature of the scanning line can be corrected.

Furthermore, when the curved surface has an axis of rotational symmetry in the subscanning direction, the degree of freedom of the curvature in the subscanning direction is increased, enabling the correction to be more accurate.

However, in order to achieve the high image quality, density unevenness is also necessary to be dissolved in addition to the above-mentioned correction. To this end, it is required to dissolve the unevenness of the amount of light in the fθ lens. The lens transmission factor herein is maximal during vertical incidence, and becomes smaller with increasing angle to the normal line of the incidence plane (incident angle). Hence, in the case of the fθ lens, the incident angler to the lens increases at the scanning end so that the transmission factor is reduced. Accordingly, the difference in amount of light between the scanning center and the scanning end is also increased.

In general, when light passes through a lens, the light absorption is generated. Specifically, by adjusting the entire thickness of the fθ lens, the light passing distance is relatively changed to longer in the center and shorter in the scanning end. Thereby, the light absorption during passing through the fθ lens becomes larger in the center and smaller in the scanning end, so that the unevenness in amount of light is reduced after passing through the fθ lens.

Figure 5:
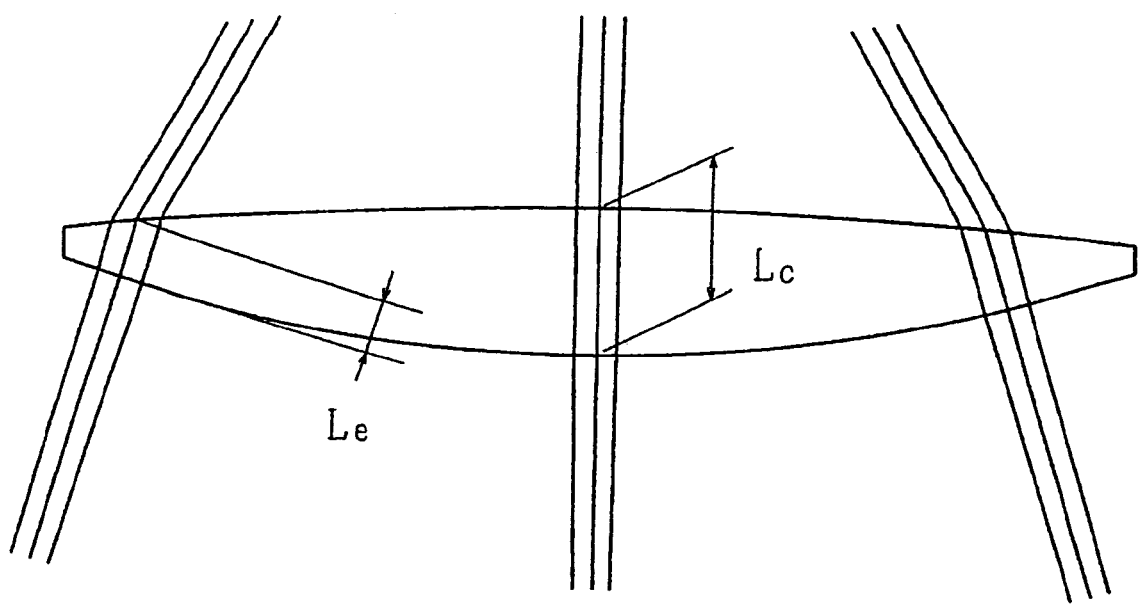
FIG. 5 is a side view showing a state that a light beam passes through an fθ lens according to the embodiment.

When the light passing distance in the central image region in the fθ lens is denoted as Lc and the light passing distance at the scanning end of the image region is denoted as Le, as shown in FIG. 5, when Lc/Le is 1, 2.2, and 2.8, the comparison of unevenness amount of light amount on the imaging surface and image evaluation results when each unevenness amount of light amount is produced are shown in FIG. 6. In the image evaluation, subjective evaluation in density unevenness is performed. As is understood from FIG. 6, with increasing Lc/Le, the unevenness in light amount on the imaging surface is reduced, so that image density unevenness is reduced. When Lc/Le is 2.2, the unevenness in light amount is 9.8%; when Lc/Le is 2.8, the unevenness in light amount is improved to 8.4%. That is, it is understood that when Lc/Le is larger than about 2.2 as the boundary value, the image be improved.

FIG. 7 is a graph comparing the difference of the unevenness in light amount before and after light passes through the fθ lens with 2.8 Lc/Le. As is understood from FIG. 7, the unevenness in light amount before the passage (in FIG. 7, the state [without fθ lens]) is 9%; by passing light through the fθ lens (in FIG. 7, the state [with fθ lens]), the unevenness is reduced to 6.3%. Hence, it is understood that the fθ lens with 2.8 Lc/Le have a function for reducing the unevenness in light amount between the scanning region center and the scanning end. In addition, an acrylic resin was used for the material of the fθ lens.

FIG. 8 is a graph comparing the difference of the unevenness in light amount before and after light passes through the fθ lens with 2.2 Lc/Le. As is understood from FIG. 8, the unevenness in light amount before passing the fθ lens is 9%; by passing light through the fθ lens, the unevenness is reduced to 7.1%. Hence, it is understood that the fθ lens with 2.2 Lc/Le have a function for reducing the unevenness in light amount between the scanning region center and the scanning end. In addition, an acrylic resin was used for the material of the fθ lens.

Figure 9:
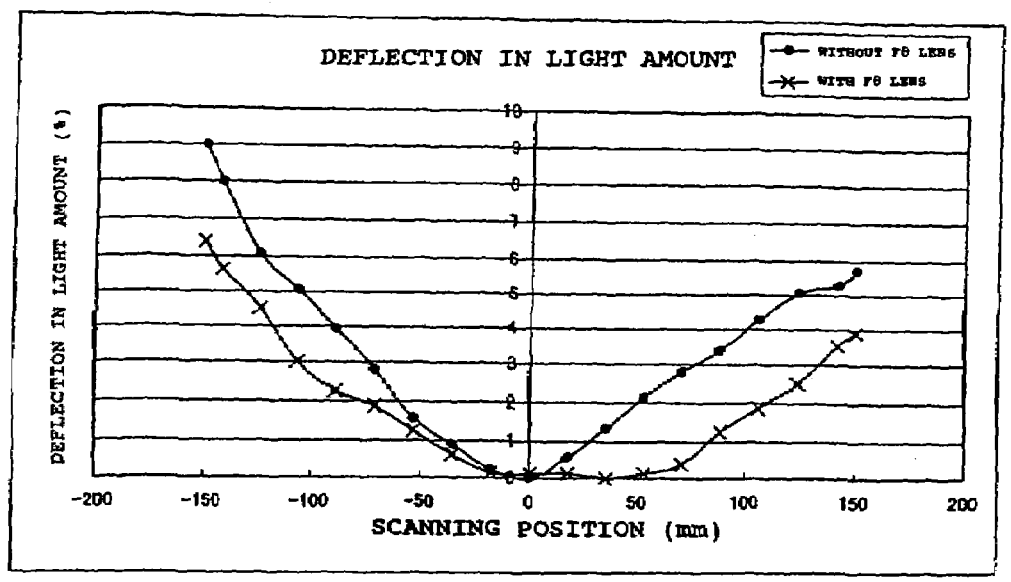
FIG. 9 is a graph comparing the difference of the unevenness in light amount before and after light passes through the fθ lens with 2.8 Lc/Le.

FIG. 9 shows the case when a cyclic olefin resin was used for the material of the fθ lens. In this example, Lc/Le was 2.8. The unevenness in light amount before passing the fθ lens is 9%; by passing light through the fθ lens, the unevenness is reduced to 6.4%. Hence, it is understood that the fθ lens using the cyclic olefin resin have a function for reducing the unevenness in light amount.

As is understood from these facts, as long as the condition Lc/Le≧2.2 is satisfied, in the case of a cyclic olefin resin, in the same way as in the case of the acrylic resin, the unevenness in light amount can also be reduced. That is, the entire materials for use in plastic lenses can be used, and forming the plastic lens using these synthetic resins to satisfy the condition Lc/Le≧2.2 reduces the unevenness in light amount.

As a result, the unevenness in light amount after passing the fθ lens is reduced, attributing to high quality images.

In addition, according to the embodiment, the over illumination optical system is exemplified; however, the under illumination optical system may also reduce the unevenness in light amount in the same way using the fθ lens satisfying the condition Lc/Le≧2.2.

According to the embodiment, the fθ lens composed of one plastic lens is exemplified; however, a lens system composed of a plurality of lenses may incorporate the invention. That is, even when the imaging optical system is composed of a plurality of lenses or when other lenses are provided along with the fθ lens, the present invention may be applied. In these cases, if the sum of passage distances of the lenses satisfies the above-mentioned relationship in the scanning central position and at the scanning end, the unevenness in light amount can be reduced in the same operation and effect as those of the embodiment. That is, when the sum of light passage distances through the lenses when scanning the center of an image region is denoted as ΣLc and the sum of light passage distances through the lenses when scanning the end of the image region is denoted as ΣLe, if ΣLc/Σle≧2.2 is satisfied, the same operation and effect as those of the embodiment can be obtained.

Moreover, when the imaging optical system is composed of a plurality of lenses, even if each lens is a combination of a glass lens and a plastic lens, the same operation and effect as those of the embodiment can be obtained. In particular, when the imaging optical system is composed of a plurality of lenses, if the imaging optical system including at least one lens surface having no coating on the surface for improving a transmission factor incorporates the present invention, the same operation and effect as those of the embodiment can be obtained.

Furthermore, according to the embodiment, a digital monochrome copying machine is exemplified as the image-forming apparatus having the optical beam scanning device assembled therein; however, the present invention is not limited to this, and entire electrophotographic image-forming apparatuses, such as a digital color copying machine, a monochrome laser printer, and a color laser printer, may be applied to the present invention, so that the same operation and effect as those of the embodiment can be obtained.

What is claimed is:

1. An optical beam scanning device comprising:
    a pre-deflection optical system for adjusting a light beam emitted from light source means so as to be focused as a line image longitudinally extending in a direction corresponding to a main scanning direction;
    optical scanning means having a plurality of reflection surfaces, the light beam being reflected by each of the plurality of reflection surfaces so as to scan an object to be scanned; and
    an imaging optical system having one or a plurality of lenses for focusing the light beam scanned by the optical scanning means on the object to be scanned,
    wherein the imaging optical system comprises a lens satisfying Lc/Le≧2.2, where a light passage distance through the inside of the lens when the light beam scans the center of an image region is denoted as Lc and a light passage distance through the inside of the lens when scanning the end of the image region is denoted as Le.

2. The device according to claim 1, wherein the imaging optical system comprises a plastic lens.

3. The device according to claim 1, wherein the imaging optical system comprises a plurality of lenses that comprise a glass lens and a plastic lens.

4. The device according to claim 1, wherein the imaging optical system comprises a plastic lens composed of one lens.

5. The device according to claim 1, wherein the imaging optical system comprises at least one lens surface having no coating on the surface for improving a transmission factor.

6. The device according to claim 1, wherein a beam incident to the optical scanning means has a width larger than that of one surface of the optical scanning means in the main scanning direction.

7. An optical beam scanning device comprising:
    a pre-deflection optical system for adjusting a light beam emitted from light source means so as to be focused as a line image longitudinally extending in a direction corresponding to a main scanning direction; optical scanning means having a plurality of reflection surfaces, the light beam being reflected by each of the plurality of reflection surfaces so as to scan an object to be scanned; and
    an imaging optical system for focusing the light beam scanned by the optical scanning means on the object to be scanned, a beam incident to the optical scanning means having a width larger than that of one surface of the optical scanning means in the main scanning direction,
    wherein the imaging optical system comprises a plurality of lenses satisfying ΣLc/ΣLe≧2.2, where when the center of an image region is scanned, the sum of light passage distances through the inside of the lenses is denoted as ΣLc and when the end of the image region is scanned, the sum of light passage distances through the inside of the lenses is denoted as ΣLe.

8. The device according to claim 7, wherein the imaging optical system comprises a plastic lens.

9. The device according to claim 7, wherein the plurality of lenses of the imaging optical system comprise a glass lens and a plastic lens.

10. The device according to claim 7, wherein the imaging optical system comprises at least one lens surface having no coating on the surface for improving a transmission factor.

11. An image-forming apparatus comprising:
    an optical beam scanning device comprising a pre-deflection optical system for adjusting a light beam emitted from light source means so as to be focused as a line image longitudinally extending in a direction corresponding to a main scanning direction; optical scanning means having a plurality of reflection surfaces, the light beam being reflected by each of the plurality of reflection surfaces so as to scan an object to be scanned; and an imaging optical system having one or a plurality of lenses for focusing the light beam scanned by the optical scanning means on the object to be scanned;

a photosensitive member having an electrostatic latent image formed thereon by a light beam scanned by the optical beam scanning device; and a developer unit for developing the electrostatic latent image formed on the photosensitive member, wherein the imaging optical system of the optical beam scanning device comprises a lens satisfying $Lc/Le \geq 2.2$, where a light passage distance through the inside of the lens when the light beam scans the center of an image region is denoted as $Lc$ and a light passage distance through the inside of the lens when scanning the end of the image region is denoted as $Le$.

12. The apparatus according to claim 11, wherein the imaging optical system comprises a plastic lens.

13. The apparatus according to claim 11, wherein a beam incident to the optical scanning means has a width larger than that of one surface of the optical scanning means in the main scanning direction.

14. An image-forming apparatus comprising:

an optical beam scanning device comprising a pre-deflection optical system for adjusting a light beam emitted from light source means so as to be focused as a line image longitudinally extending in a direction corresponding to a main scanning direction; optical scanning means having a plurality of reflection surfaces, the light beam being reflected by each of the plurality of reflection surfaces so as to scan an object to be scanned; and an imaging optical system for focusing the light beam scanned by the optical scanning means on the object to be scanned, a beam incident to the optical scanning means having a width larger than that of one surface of the optical scanning means in the main scanning direction;

a photosensitive member having an electrostatic latent image formed thereon by a light beam scanned by the optical beam scanning device; and a developer unit for developing the electrostatic latent image formed on the photosensitive member, wherein the imaging optical system comprises a plurality of lenses satisfying $\Sigma Lc/\Sigma Le \geq 2.2$, where when the center of an image region is scanned, the sum of light passage distances through the inside of the lenses is denoted as $\Sigma Lc$ and when the end of the image region is scanned, the sum of light passage distances through the inside of the lenses is denoted as $\Sigma Le$.

15. The apparatus according to claim 14, wherein the imaging optical system comprises a plastic lens.

16. The apparatus according to claim 14, wherein a beam incident to the optical scanning means has a width larger than that of one surface of the optical scanning means in the main scanning direction.

* * * * *